United States Patent
Chen et al.

(10) Patent No.: US 8,713,757 B2
(45) Date of Patent: May 6, 2014

(54) SLIDE COVER LIFTING STRUCTURE

(75) Inventors: Chia Hui Chen, Taoyuan (TW);
Che-Hsien Lin, Taoyuan (TW);
Po-Hsiang Hu, Taoyuan (TW)

(73) Assignee: Lianhong Art Co., Ltd., Taoyuan (TW)

( * ) Notice: Subject to any disclaimer, the term of this patent is extended or adjusted under 35 U.S.C. 154(b) by 538 days.

(21) Appl. No.: 13/168,941

(22) Filed: Jun. 25, 2011

(65) Prior Publication Data

US 2012/0328222 A1 Dec. 27, 2012

(51) Int. Cl.
*E05D 7/00* (2006.01)
*E05D 3/06* (2006.01)

(52) U.S. Cl.
USPC .............. 16/354; 16/366; 16/357; 16/327

(58) Field of Classification Search
CPC ... G06F 1/1681; G06F 1/1616; G06F 1/1679;
E05Y 2900/60; E05Y 2900/606; E04M 1/022;
E04M 1/0214; E04M 1/0216; E05D 3/122;
E05D 3/12; E05D 3/16; E05D 3/06; E05D
3/18; E05D 3/32; E05D 11/1078; E05D
11/1021; H05K 5/0226
USPC ........... 16/327, 331, 333, 338, 340, 366, 354,
16/357, 360, 346, 345, 368, 369;
361/679.08, 679.11, 679.02, 679.15,
361/679.27, 679.21, 679.09, 679.22;
455/90.3, 575.1, 575.3, 575.8;
379/433.12, 433.13; 348/373, 333.01,
348/333.06, 794; 248/274.1, 284.1, 286.1,
248/287.1, 419, 420
See application file for complete search history.

(56) References Cited

U.S. PATENT DOCUMENTS

| | | | | |
|---|---|---|---|---|
| 3,862,896 A * | 1/1975 | Singleton | ...................... | 204/198 |
| 4,852,032 A * | 7/1989 | Matsuda et al. | .......... | 361/679.27 |
| 4,859,092 A * | 8/1989 | Makita | .............. | 400/83 |
| 6,091,600 A * | 7/2000 | Jeong | ........................ | 361/679.12 |
| 6,191,937 B1 * | 2/2001 | Bang | ........................ | 361/679.23 |
| 7,063,225 B2 * | 6/2006 | Fukuo | ........................... | 220/264 |
| 7,187,538 B2 * | 3/2007 | Homer et al. | ............. | 361/679.21 |
| 7,733,644 B2 * | 6/2010 | Wilson et al. | ............. | 361/679.49 |
| 8,250,711 B1 * | 8/2012 | Chen et al. | ..................... | 16/354 |
| 8,347,461 B2 * | 1/2013 | Chen et al. | ..................... | 16/354 |
| 8,559,623 B2 * | 10/2013 | Chen et al. | ................ | 379/433.12 |
| 2007/0180657 A1 * | 8/2007 | Zeilbeck et al. | ................ | 16/354 |
| 2008/0196201 A1 * | 8/2008 | Anderson | ....................... | 16/232 |

* cited by examiner

*Primary Examiner* — Chuck Mah
(74) *Attorney, Agent, or Firm* — Guice Patents PLLC

(57) ABSTRACT

A slide cover lifting structure used in an electronic device consisting of a base member and a cover panel is disclosed to include a pair hinges, a pair of sliding rail holders, a pair of bearing members, a pair of plastic slide guides, a pair of sliding rails, a transmission shaft, two gear sets and a pair of gear racks. The gear sets are provided between the sliding rail holders and the bearing members for transmission of applied force. The transmission shaft is mounted in the base member (system end), allowing free utilization of the internal circuit board space of the base member.

10 Claims, 15 Drawing Sheets

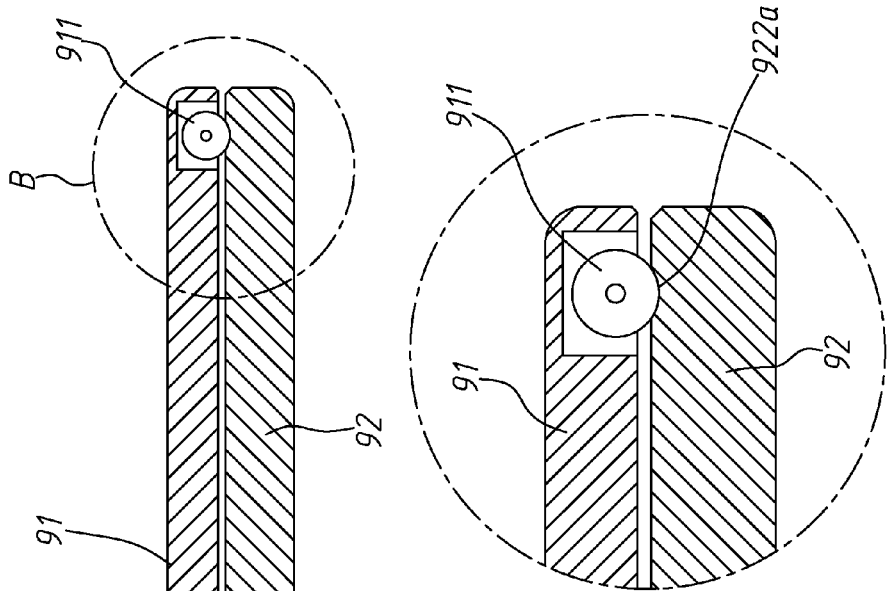
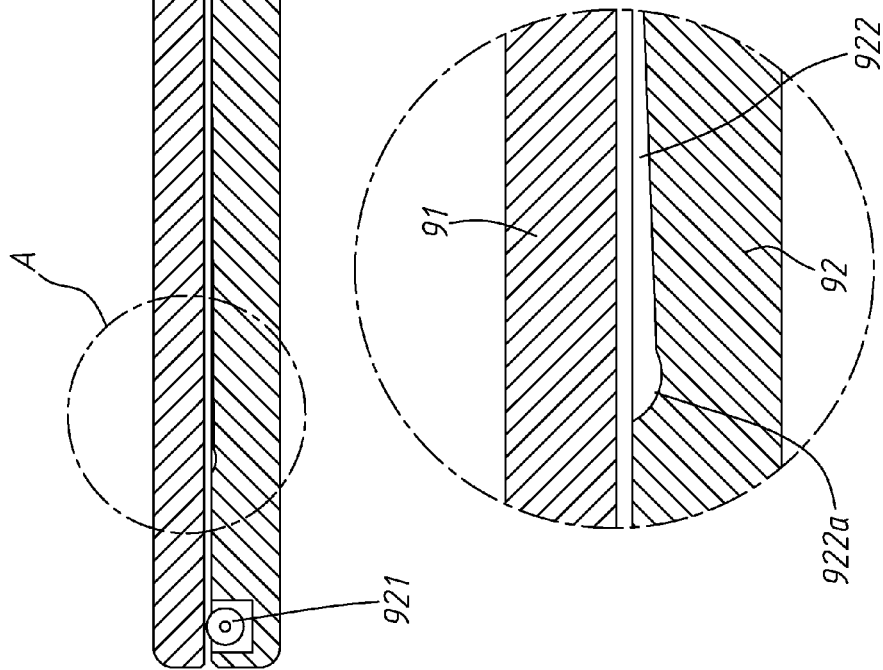
FIG. 14
FIG. 14A
FIG. 14B

SLIDE COVER LIFTING STRUCTURE

BACKGROUND OF THE INVENTION

1. Field of the Invention

The present invention relates to slide cover mounting technology and more particularly, to a slide cover lifting structure for use in an electronic device, for example, tablet computer, in the transmission shaft which enables the top cover panel of the electronic device to be moved smoothly and stably in horizontal relative to the base panel of the electronic device and then lifted from a horizontal position to a tilted position is kept in the base member of the electronic device.

2. Description of the Related Art

There are tablet computers that comprise an operating system end arranged at the bottom side of a LCD display panel in such a manner that the LCD display panel can be moved horizontally relative to the operating system end and then lifted to a tilted position so that the user can use the keyboard on the operating system end. To satisfy this operation, a special slide cover mounting arrangement is necessary.

U.S. patent application Ser. No. 13/156,672, invented by the present inventor, discloses a slide cover mounting design entitled "DOUBLE SLIDING STABILITY SPACE-SAVING SLIDE COVER LIFTING STRUCTURE". According to this design, two gears are mounted on an axle near its two distal ends and the two distal ends of the axle are respectively pivotally coupled between two sliding rail mechanisms so that the cover panel of the electronic device can be turned about the pivot shafts of the hinges relative to the base member, and at the same time, the gears are kept in mesh with the respective gear racks stabilizing movement of the cover panel relative to the base member.

According to this design, the axle and the gears are installed in the sliding rail mechanisms, i.e., at the side of the LCD screen of the cover panel. When the cover panel is changed from the close position to a sliding status and then opened to a 75° angle position, the fixed axle will be moved with the LCD screen of the cover panel and exposed to the outside. In order to maintain the sense of beauty, a protective covering must be added to the cover panel. In consequence, the base member must provide an accommodation space for accommodating the protective covering when it is closed on the base member. This accommodation chamber limits the utilization of the internal circuit board space of the base member, causing unfavorable effects on tablet computer fabrication.

Further, because the hinges that are provided at the cover panel to provide torque are kept apart at a long distance, they tend to spring back when the cover panel is lifted. In this prior art design, there is no any other support design, and therefore the size of the hinges must be relatively increased to avoid spring back, not in conformity with compacting design.

Further, in the aforesaid prior art design, spring plates are used for stopping against the respective sliding rails to stop the cover panel in the open or close position. However friction between the spring plates and the sliding rails will cause surface damage. An improvement in this regard is necessary.

SUMMARY OF THE INVENTION

The present invention has been accomplished under the circumstances in view. It is main object of the present invention to provide a slide cover lifting structure for use in an electronic device comprising a cover panel and a base member, which eliminates the drawbacks of the aforesaid prior art design.

To achieve this and other objects of the present invention, a slide cover lifting structure is used in an electronic device consisting of a cover panel and a base member, comprising: two hinges respectively fixedly mounted in two opposite sidewalls of the base member, each comprising a non-circular pivot axle and a torque providing device; two sliding rail holders respectively connected to the non-circular pivot axles of the two hinges and rotatable with the associating non-circular pivot axles relative to the base member, each comprising a connection block connected to the non-circular pivot axle of the associating hinge; two bearing members respectively affixed to the sliding rail holders, each having two grooves disposed at two opposite lateral sides thereof; two plastic slide guides respectively formed of a pair of channel bars and respectively fixedly mounted in the grooves of the bearing members, each defining a sliding groove; two sliding rails bilaterally fixedly mounted on a bottom surface of the cover panel in a parallel manner, each comprising a flat, elongated base panel affixed to the cover panel, an angled rail extending along each of two opposite lateral side of the flat, elongated base panel and respectively slidably coupled to the sliding grooves of the channel bars of the plastic slide guides; a transmission shaft having two distal ends thereof respectively inserted through the brackets of the hinges and affixed to the base member; two gear sets partially pivotally mounted on the sliding rail holders and partially pivotally mounted on the brackets of the hinges, each comprising a first gear mounted on one of the two distal ends of the transmission shaft and a last gear partially and upwardly protruding over the associating sliding rail holder and the associating bearing member; and two gear racks respectively affixed to the flat, elongated base panels of the sliding rails at a bottom side thereof and respectively meshed with the last gears of the gear sets. The two sliding rails are moved with the cover panel in the sliding grooves of the plastic slide guides relative to the base member when the cover panel receives a horizontal push force, and the same time, the gear racks are forced to rotate the last gears of the gear sets, enabling the horizontal push force to be evenly transferred through the transmission shaft to the two opposite lateral sides of the base member; when the cover panel is tuned about the pivot axles of the hinges relative to the base member, the last gears of the gear sets are kept in positive engagement with the gear racks.

Further, the flat, elongated base panel of each sliding rail comprises a plurality of internally threaded columns respectively affixed to the cover panel with screws. Further, each sliding rail holder comprises a non-circular coupling hole located on the connection block thereof and coupled to the non-circular pivot axle of the associating hinge.

The slide cover lifting further comprises two first rollers respectively pivotally mounted in the base member at two opposite lateral sides and two second rollers respectively pivotally mounted in the cover panel at two opposite lateral sides, the first rollers and the second rollers being adapted to maintain a constant gap between the cover panel and the base member, and two slanted grooves respectively formed in the base member in the sliding path of the first rollers at the cover panel for enabling the constant gap to be kept between the cover panel and the base member when the cover panel is lifted from the base member. Each slanted groove comprises two half moon shaped groove portions for enabling the cover panel to be positively positioned in one of an open position and a close position.

Further, the angled rail portion of each sliding rail comprises two notches. Further, each sliding rail holder comprises a recessed portion corresponding to the angled rail portion of the associating sliding rail, a resilient wire rod mounted in the recessed portion, and a wheel pivotally mounted on the resilient wire rod and forcible by the resilient wire rod into engagement with one of the two notches of the angled rail portion of the associating sliding rail.

The slide cover lifting structure further comprises two supplementary support bars respectively coupled between the sliding rail holders and the brackets of the hinges. Each supplementary support bar has a first end thereof pivotally connected to the associating sliding rail holder, and a second end thereof slidably coupled to the bracket of the associating hinge.

Further, the bracket of each hinge comprises a longitudinal sliding slot and a recessed portion around a rear end of the longitudinal sliding slot. Further, the second end of each supplementary support bar is slidably coupled to the longitudinal sliding slot of the bracket of the associating hinge by a coupling bolt, a slide plate, a set of spring washers and a locknut. The coupling bolt is movably stopped at one side of the bracket of the associating hinge, comprising a round rod located on one end thereof and pivotally coupled with the second end of the associating supplementary support bar and a threaded shank located on an opposite end thereof and inserted in proper order through the longitudinal sliding slot of the bracket of the associating hinge, the slide plate and the spring washers and screwed up with the locknut. The slide plate is attached to an opposite side of the bracket of the associating hinge, comprising a beveled edge facing the bracket of the associating hinge and a guide rod inserted into the longitudinal sliding slot of the bracket of the associating hinge.

BRIEF DESCRIPTION OF THE DRAWINGS

FIG. 4A is an enlarged view of one bearing member of the slide cover lifting structure in accordance with the present invention.

FIG. 13A is an enlarged view of Part A of FIG. 13.

FIG. 14 is a schematic sectional view of the present invention, illustrating the relative arrangement of the rollers between the cover panel and the base member.

FIG. 14A is an enlarged view of Part A of FIG. 14.

FIG. 14B is an enlarged view of Part B of FIG. 14.

DETAILED DESCRIPTION OF THE PREFERRED EMBODIMENT

Figure 1:
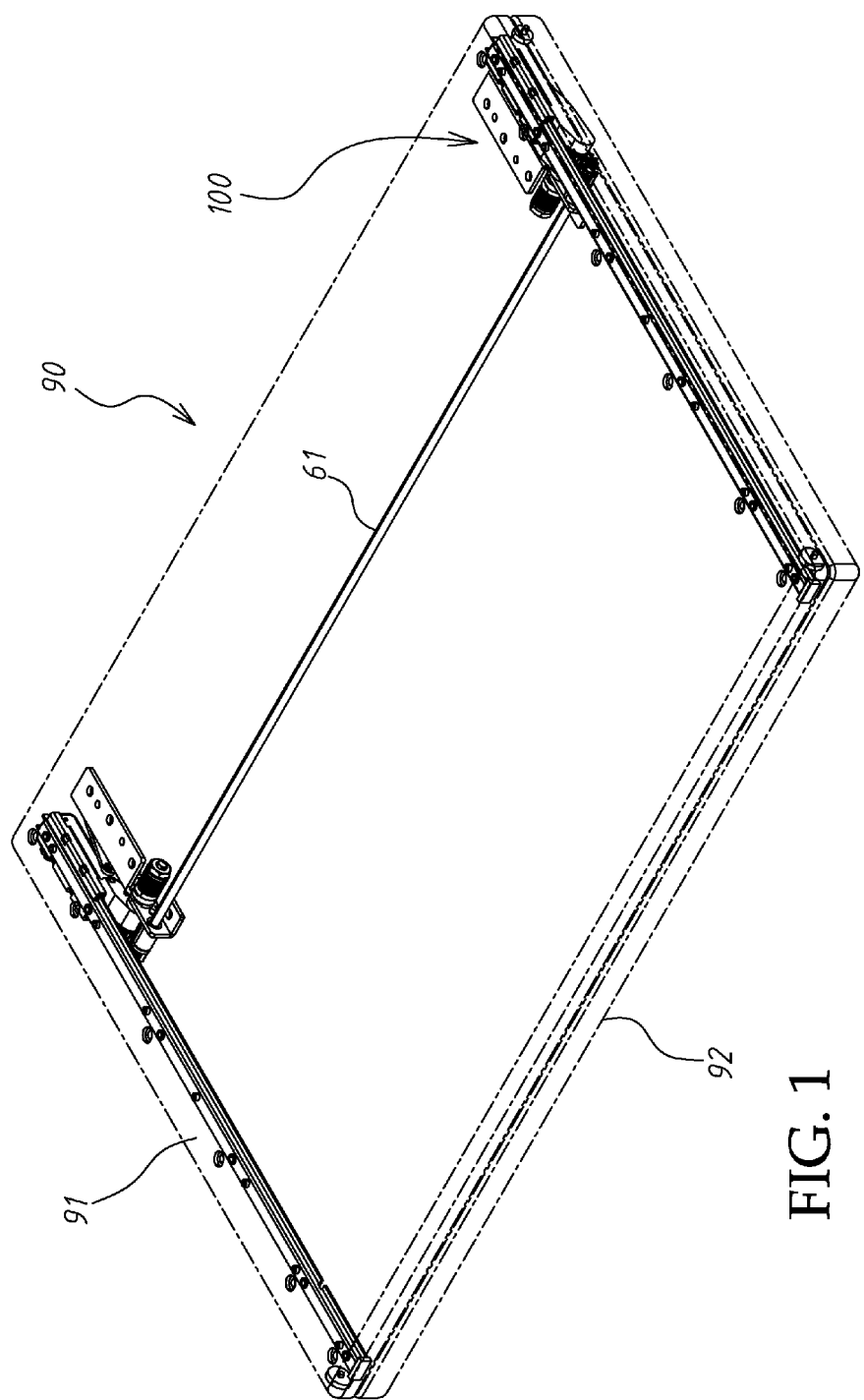
FIGS. 1~3 illustrate the use of a slide cover lifting structure in an electronic device in accordance with the present invention.
Figure 2:
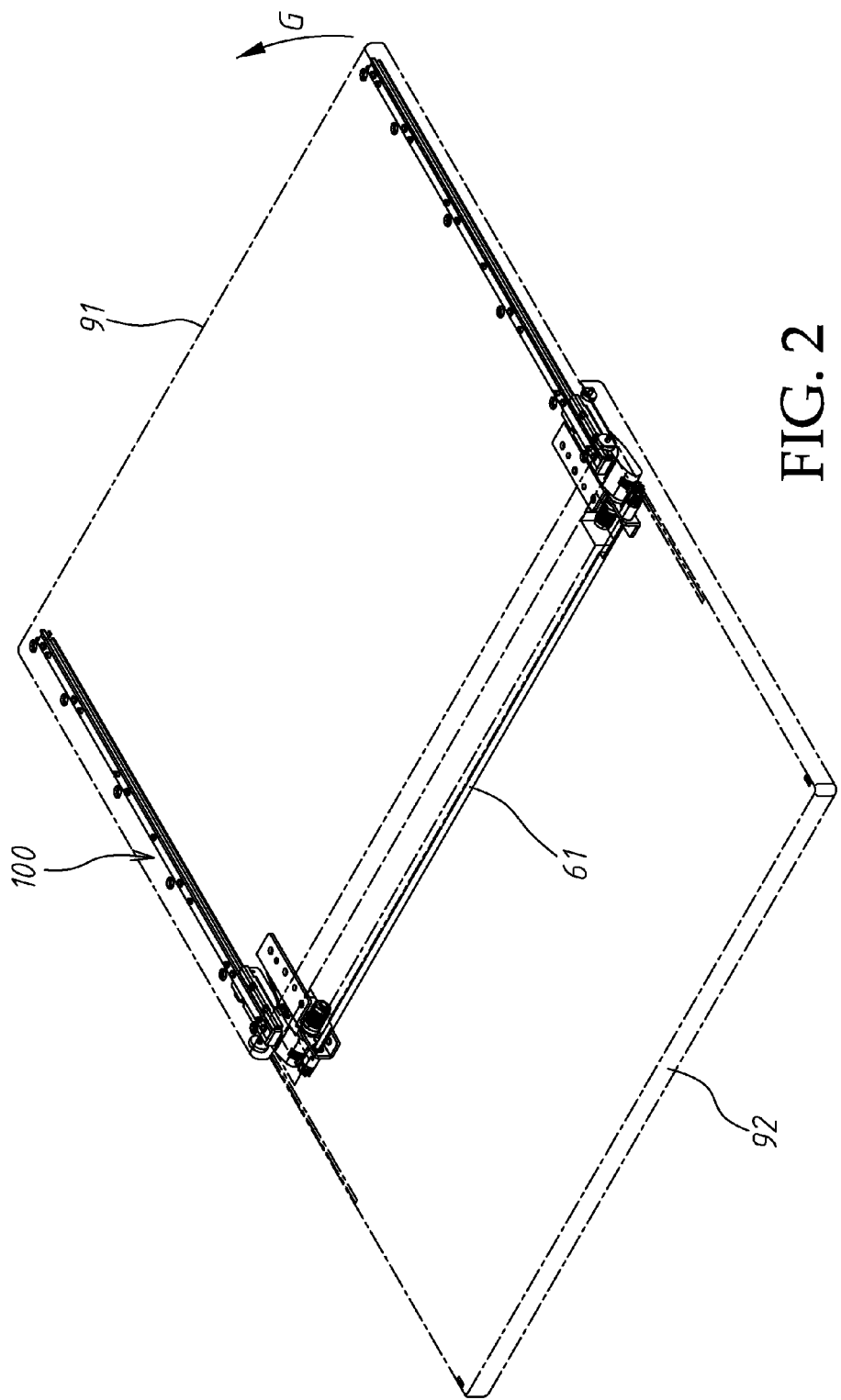
Figure 3:
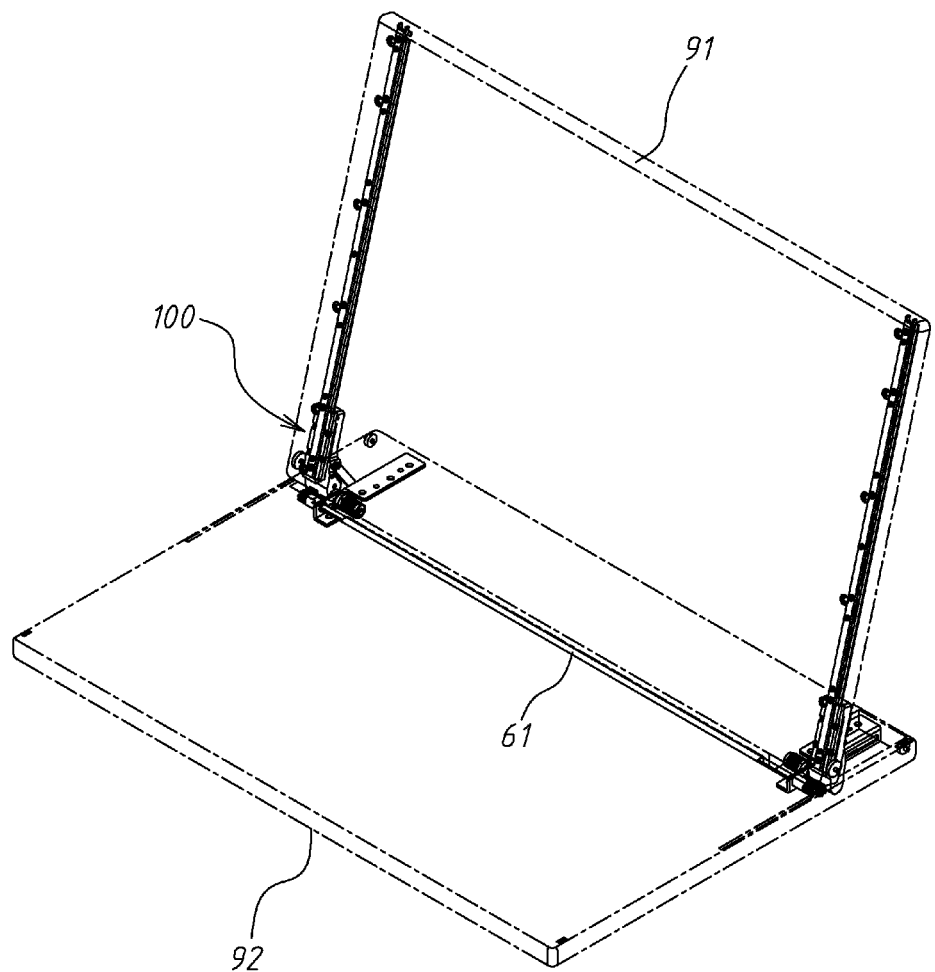

Referring to FIGS. 1~3, a slide cover lifting structure 100 in accordance with the present invention is shown used in an electronic device 90 comprising a cover panel 91 and a base member 92. The electronic device 90 can be, for example, a tablet computer. The cover panel 91 is a LCD display panel. The base member 92 is the operating system end of the electronic device 90, comprising a keyboard. When opening the cover panel 91, move the cover panel 91 horizontally relative to the base member 92 (see FIG. 2), and then bias the cover panel 91 to a tilted position relative to the base member 92 (see FIG. 3).

Referring to FIGS. 4~8, the slide cover lifting structure 100 comprises a pair hinges 10, a pair of sliding rail holders 20, a pair of bearing members 30, a pair of plastic slide guides 40, a pair of sliding rails 50, two gear sets 60 and a pair of gear racks 70. These component pairs are symmetrically mounted on two distal ends of a transmission shaft 61.

The hinges 10 each comprises a bracket 11, which is affixed to a rear inner edge of one of the two opposite sidewalls of the base member 92, a non-circular pivot axle 12 pivotally coupled to the bracket 11, and a torque providing device 13. The torque providing device 13 comprises a concave wheel 131 and a stop plate 136 set between the bracket 11 and the concave wheel 131. The stop plate 136 has a sector portion matching with a protruding block 127 at the bracket 11 (se FIG. 4A or FIG. 5) to limit the angle of rotation of the non-circular pivot axle 12.

Figures 6, 6A:
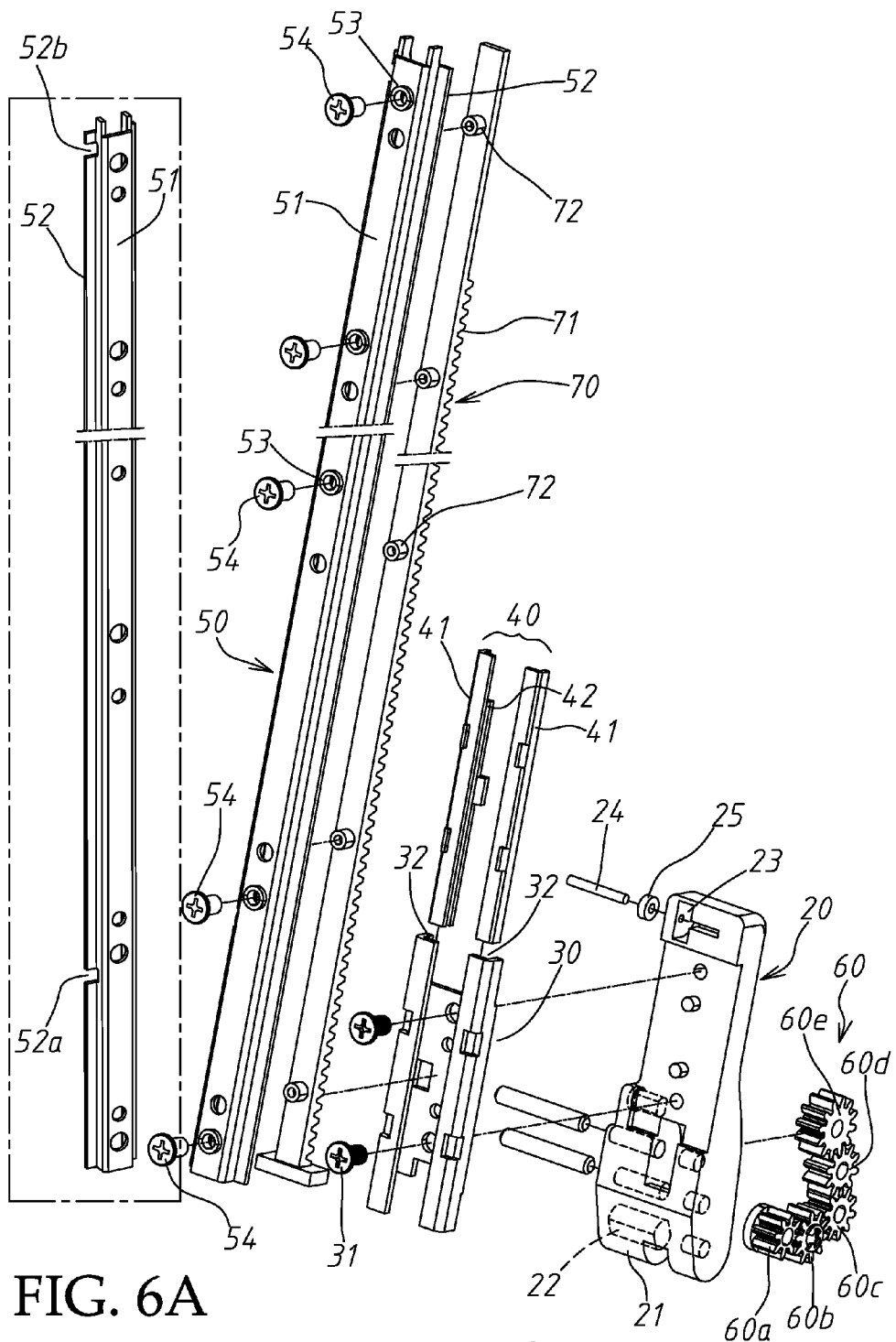
FIG. 6 is an exploded view of still another part of the slide cover lifting structure in accordance with the present invention.
FIG. 6A is an elevational view of one sliding rail of the slide cover lifting structure in accordance with the present invention.

Referring to FIG. 6, each sliding rail holder 20 comprises a connection block 21, and a non-circular coupling hole 22 formed in the connection block 21 and coupled to the non-circular pivot axle 12 of one of the hinges 10 for allowing rotation of the respective sliding rail holder 20 with the associating non-circular pivot axle 12 relative to the base member 92.

The bearing members 30 are respectively affixed to the sliding rail holders 20 with screw nails 31, each having two grooves 32 disposed at two opposite lateral sides thereof.

The plastic slide guides 40 are respectively formed of a pair of channel bars 41 and respectively fixedly mounted in the grooves 32 of the bearing members 30. Each channel bar 41 defines a sliding groove 42.

The sliding rails 50 each comprises a flat, elongated base panel 51 affixed to the bottom surface of the cover panel 91, two angled rail portions 52 respectively extending along the two opposite lateral sides of the flat, elongated base panel 51 (see FIG. 6 and FIG. 6A). The angled rail portions 52 are respectively and slidably coupled to the sliding grooves 42 of the plastic slide guides 40 (see FIG. 7). Further, the flat, elongated base panel 51 comprises a plurality of internally threaded columns 53 respectively affixed to the bottom surface of the cover panel 91 with screws 54.

Figure 7:
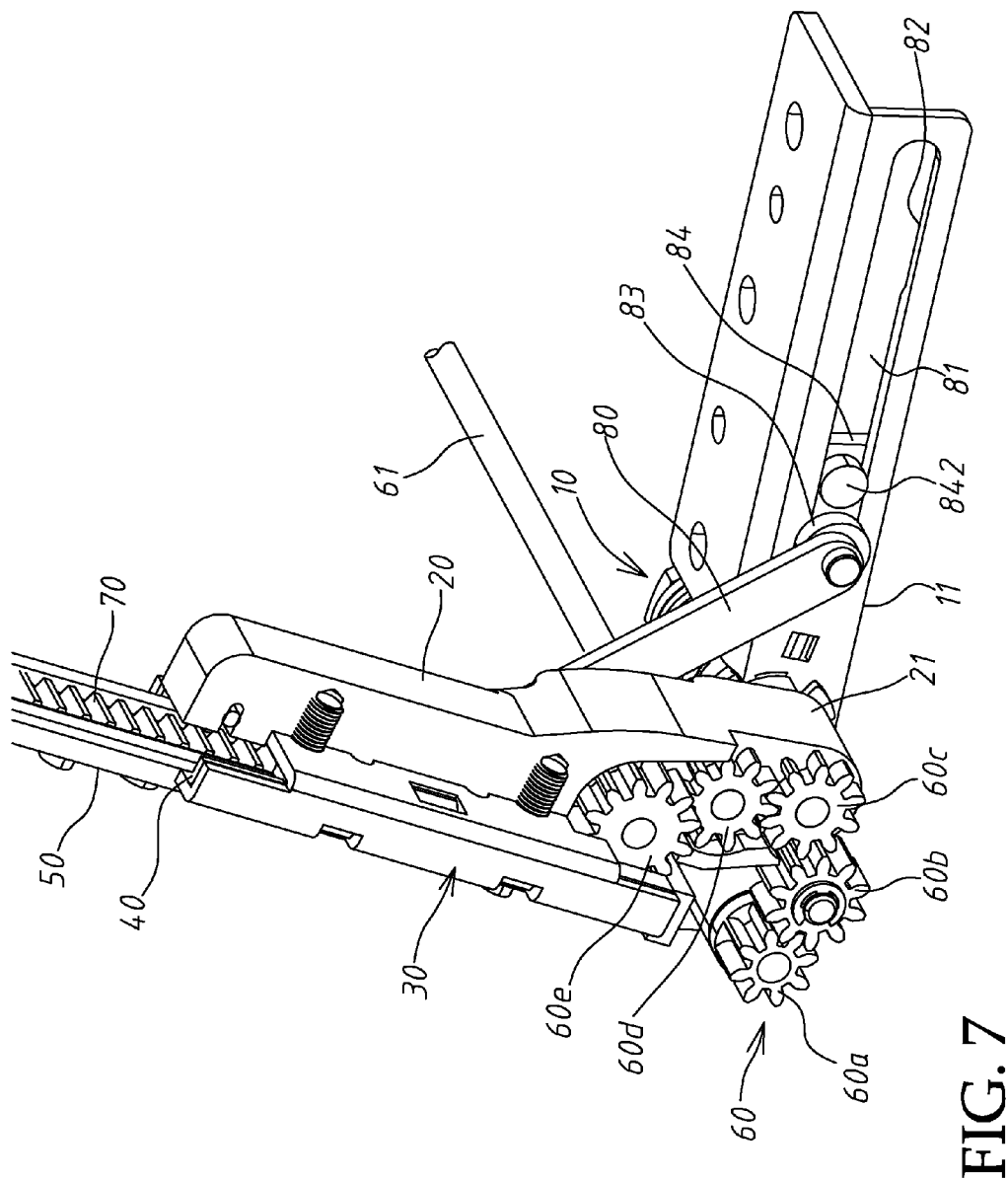
FIG. 7 is an elevational assembly view of a part of the slide cover lifting structure in accordance with the present invention.

The gear sets 60, as shown in FIGS. 6 and 7, each comprise a first gear 60a and a second gear 60b respectively pivotally mounted on the brackets 11 of the hinges 10, a third gear 60c, a fourth gear 60d and a fifth gear (the last gear) 60e respectively pivotally mounted on the sliding rail holders 20. Further, the first gears 60a of the gear sets 60 are respectively fastened to the two distal ends of the transmission shaft 61. The two distal ends of the transmission shaft 61 are respectively inserted through the brackets 11 of the hinges 10 and affixed to the base member 92. Further, the teeth 62 of the fifth gears (the last gear) 60e of the gear sets 60 protrude partially upwardly over the respective sliding rail holders 20 and the respective bearing members 30 and meshed with the gear racks 70.

Figure 9:
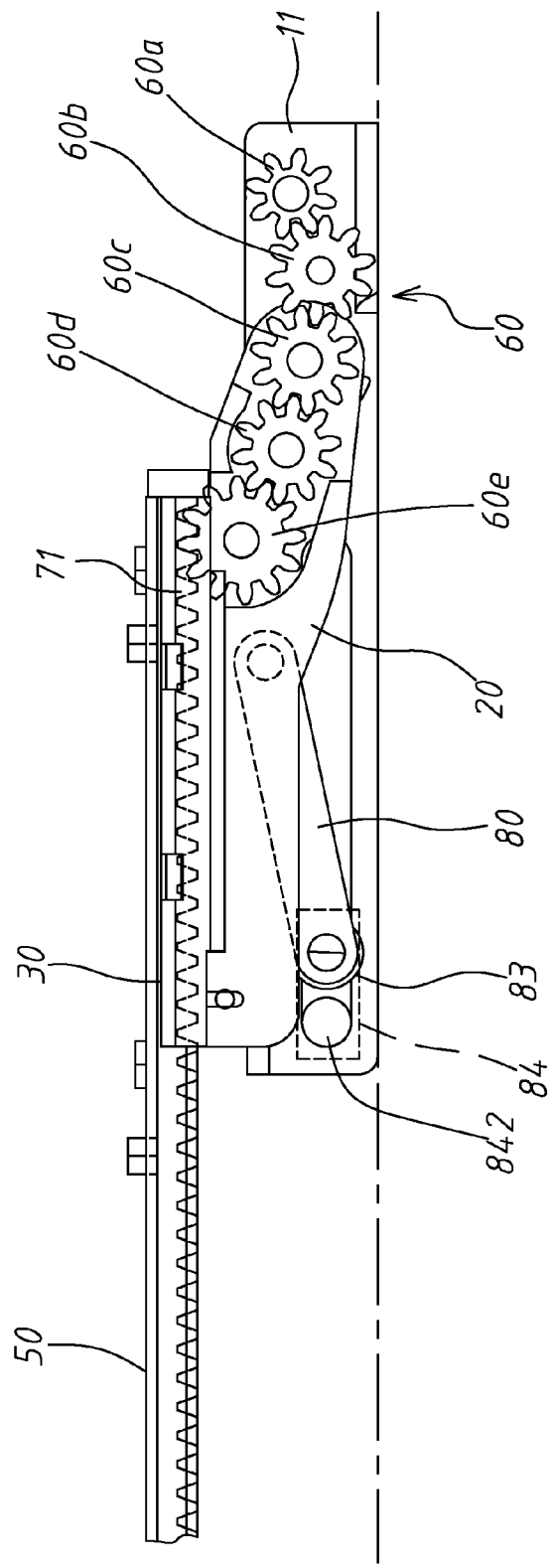
FIG. 9 is a schematic drawing of the present invention, illustration the slide cover lifting structure in operation (I).

The gear racks 70 are respectively affixed to the bottom walls of the flat, elongated base panels 51 of the sliding rails 50, keeping the respective tooth faces 71 in mesh with the fifth gears (the last gear) 60e of the gear sets 60, as shown in FIG. 9. Further, each gear rack 70 comprises a plurality of pins 72 respectively inserted into respective round holes of the associating sliding rail 50 and heat sealed thereto to secure the respective gear rack 70 to the inner side of the respective sliding rail 50.

As stated above, the slide cover lifting structure 100 of the present invention is used in the electronic device 90. When the cover panel 91 receives a horizontal push force, it will slide forwards relative to the base member 92 (see FIG. 2). At this time, the angled rail portions 52 of the sliding rails 50 are respectively moved in the sliding grooves 42 of the plastic slide guides 40, and at the same time, the gear racks 70 are forced to rotate the fifth gears (last gears) 60e of the gear sets 60 (see FIG. 9), enabling the horizontal push force to be evenly transferred through the transmission shaft 61 to the two opposite lateral sides of the base member 92, avoiding uneven biasing of the cover panel 91 during its sliding movement. Further, the cover panel 91 can be tuned about the pivot axles 12 of the hinges 10 relative to the base member 92 (see FIG. 3), keeping the fifth gears (last gears) 60e of the gear sets 60 in positive engagement with the gear racks 70.

Figure 10:
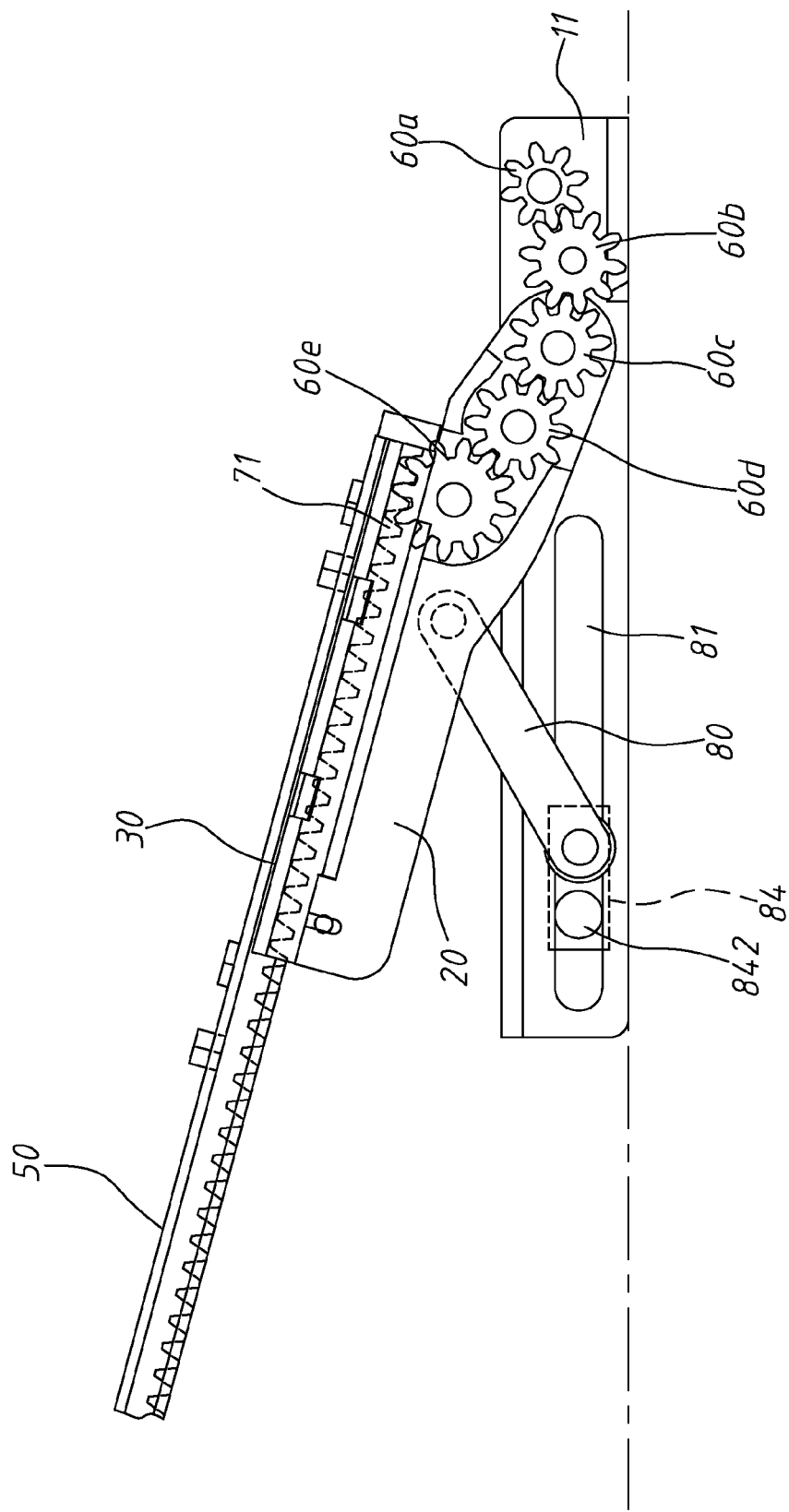
FIG. 10 is a schematic drawing of the present invention, illustration the slide cover lifting structure in operation (II).
Figure 11:
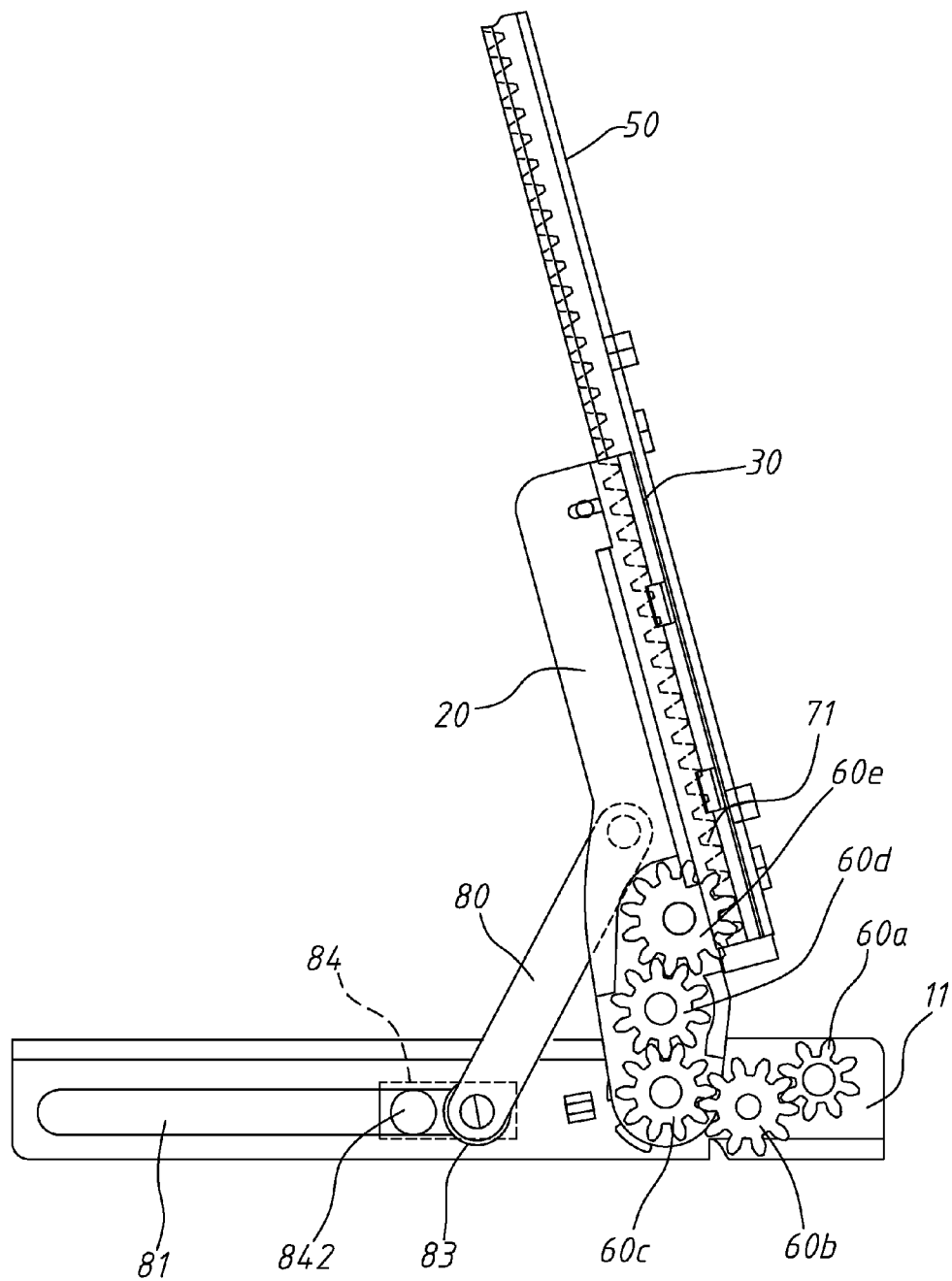
FIG. 11 is a schematic drawing of the present invention, illustration the slide cover lifting structure in operation (III).

FIGS. 9~11 illustrate the relative position of the gears of the gear sets 60 during lifting of the cover panel 91. In FIG. 9, the contained angle between the cover panel 91 and the base member 92 is zero degree. In FIG. 10, the contained angle between the cover panel 91 and the base member 92 is 50° angle where the second gear 60b and the third gear 60c are relatively rotated, the gears 60a~60e are kept meshed together. In FIG. 11, the contained angle between the cover panel 91 and the base member 92 is 75° angle, i.e., the maximum opening angle, where the second gear 60b and the third gear 60c are relatively rotated, the gears 60a~60e are kept meshed together.

Figure 8:
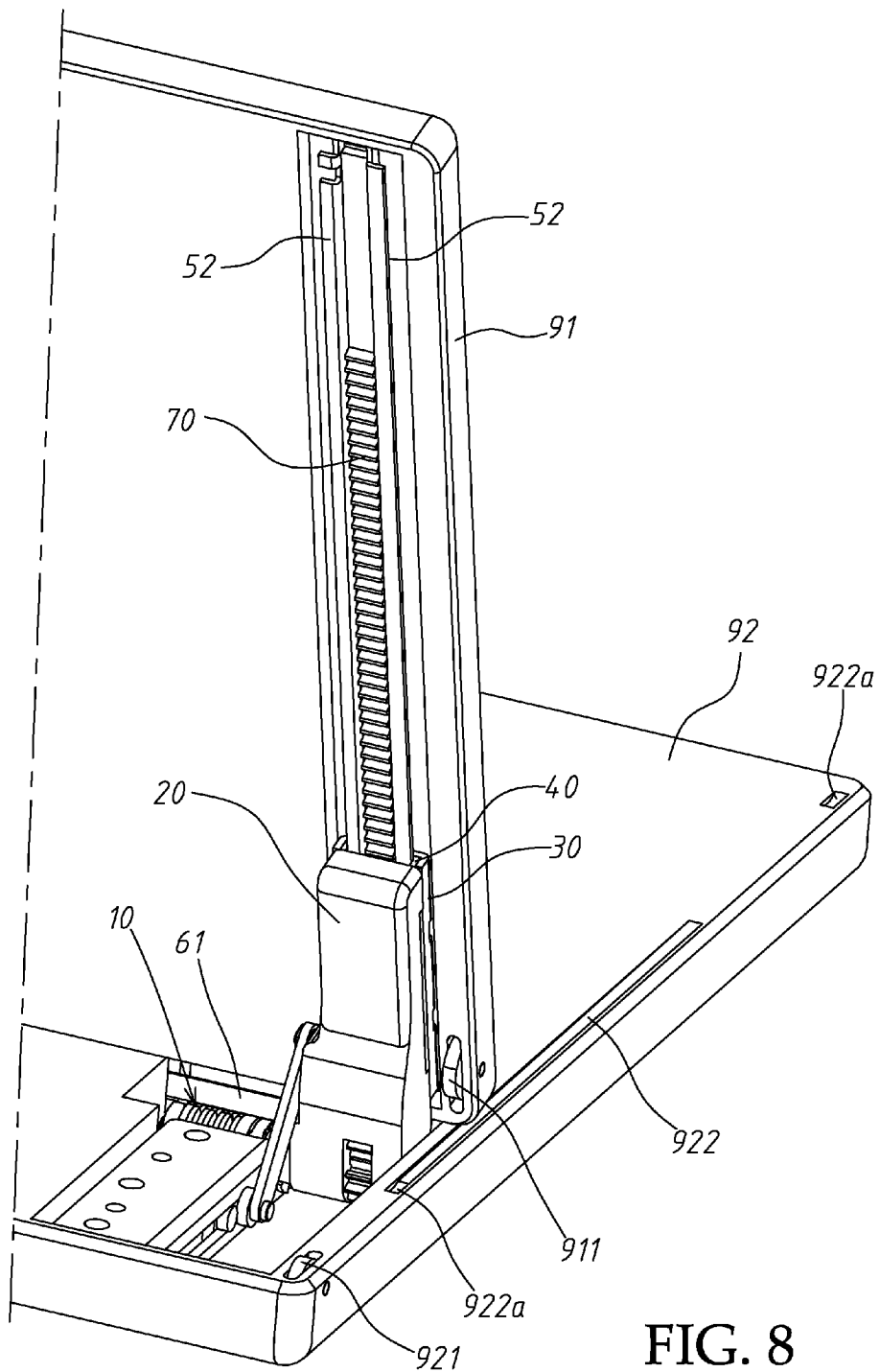
FIG. 8 is a schematic drawing illustrating the arrangement of a part of the slide cover lifting structure in the electronic device in accordance with the present invention.

According to the present invention, the gears 60a~60e of the gear sets 60 are used to transfer biasing forcer and the transmission shaft 61 is affixed to the inside of the base member (system end) 92. This arrangement reduces impact to the circuit board in the cover panel 91. When the cover panel (LCD end) 91 is changed from the close position to a sliding status, the transmission shaft (axle) of the prior art design will become movable with the LCD panel (cover panel) of the electronic device after the cover panel having been biased to 75° angle. The invention improves the linking design of the transmission shaft to heave the transmission shaft be fixedly mounted in the base member (system end) 92 of the electronic device 90 so that the gears of the gear sets 60 can positively transfer the applied pressure. Thus, it is not necessary to design a protective covering on the back side of the cover panel 91 or to provide an accommodation chamber in the base member 92, and therefore the circuit board space can be fully utilized without limitation and the sense of beauty of the cover panel 91 is maintained, as shown in FIG. 8.

Figure 12:
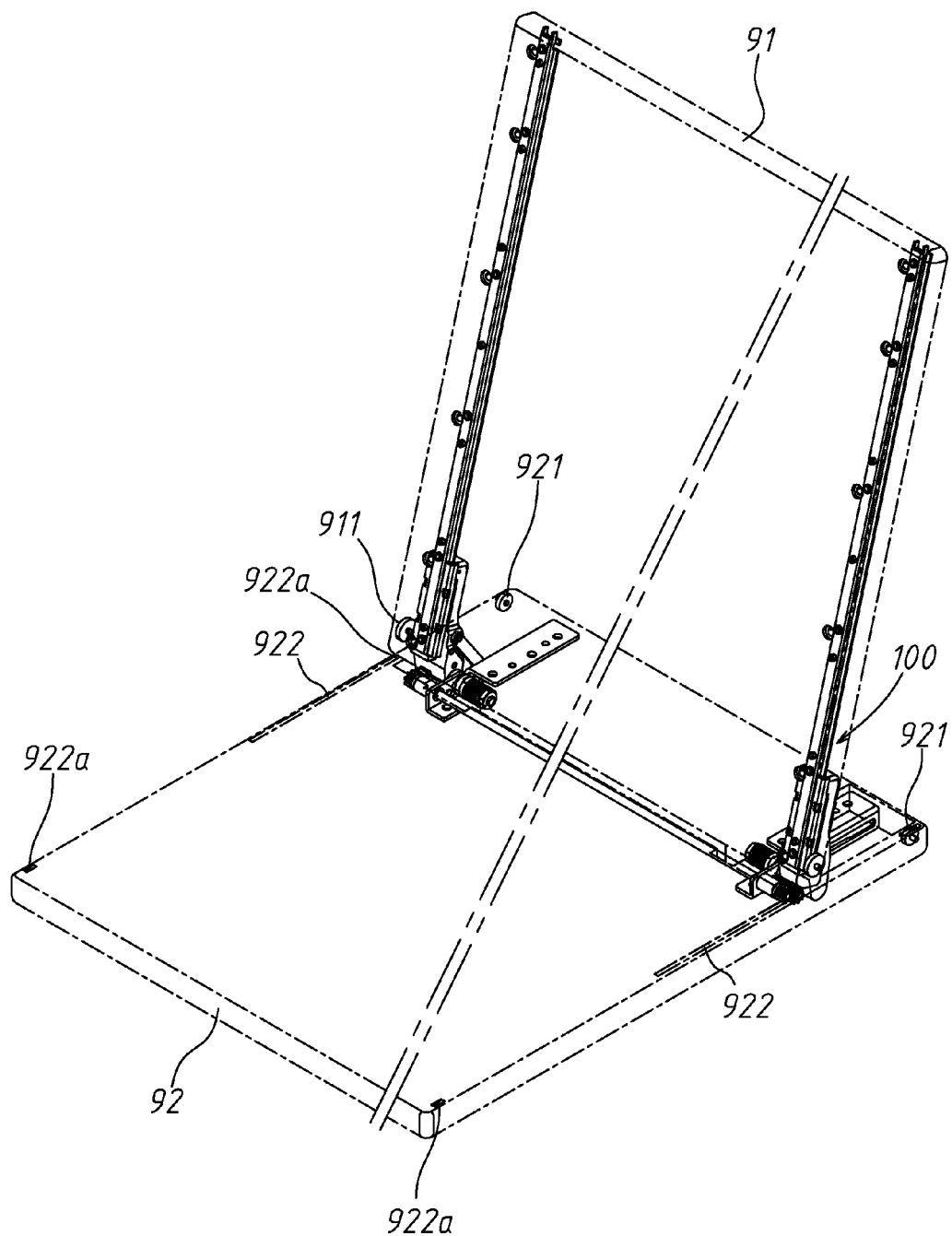
FIG. 12 is a perspective view of the present invention, illustrating the arrangement of the slide cover lifting structure in the electronic device.
Figure 13:
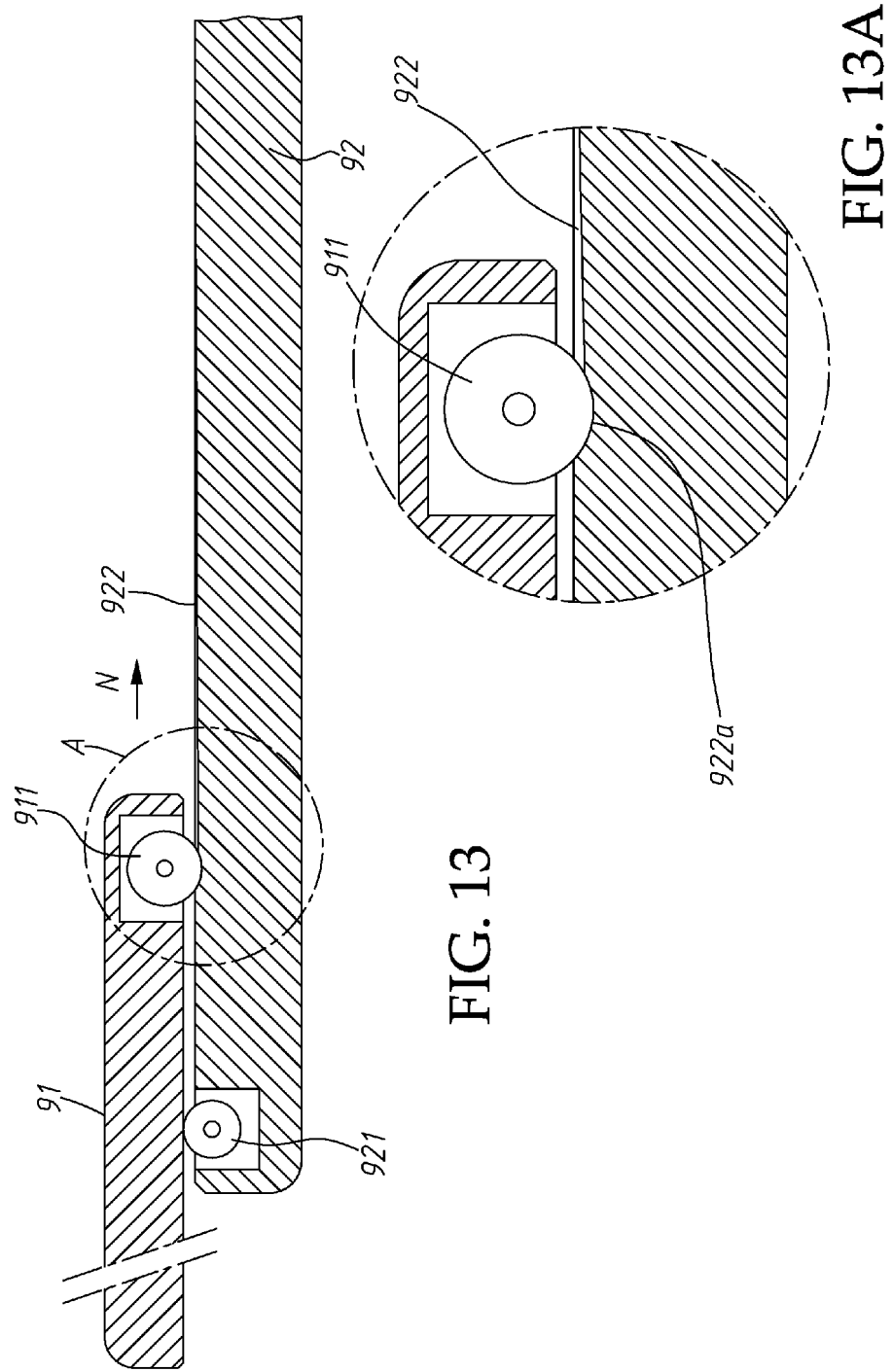
FIG. 13 is a schematic sectional view of the present invention, illustrating an operation status of the rollers of the cover panel.

Referring to FIG. 12, two rollers 921 are respectively mounted in the top wall of the base member 92 at two opposite lateral sides near the front edge of the base member 92; two rollers 911 are respectively mounted in the bottom wall of the cover panel 91 at two opposite lateral sides near the rear edge of the cover panel 91. Subject to the arrangement of the rollers 911; 921 the gap between the cover panel 91 and the base member 92 remains unchanged, avoiding bias of the cover panel 91 during relative sliding movement between the cover panel 91 and the base member 92. Further, the base member 92 has two slanted grooves 922 respectively disposed in the sliding path of the rollers 911 of the cover panel 91. During sliding movement of the rollers 911 with the cover panel 91 from the open position (see FIG. 13) to the close position (see FIG. 14), the slanted grooves 922 enable the cover panel 91 to be lifted gradually, as indicated by the arrowhead B in FIG. 13, leaving a gap between the cover panel 91 and the top surface of the base member 92 so that when the user accidentally imparts a downward pressure to the cover panel 91 when moving it, the cover panel 91 will not touch the keyboard, button or any protruding components of the base member 92, avoiding component damage.

Further, each slanted groove 922 has two half moon shaped groove portions 922a for positive positioning of the cover panel 91 in the open position (see FIG. 13) or close position (see FIG. 14).

Figure 15:
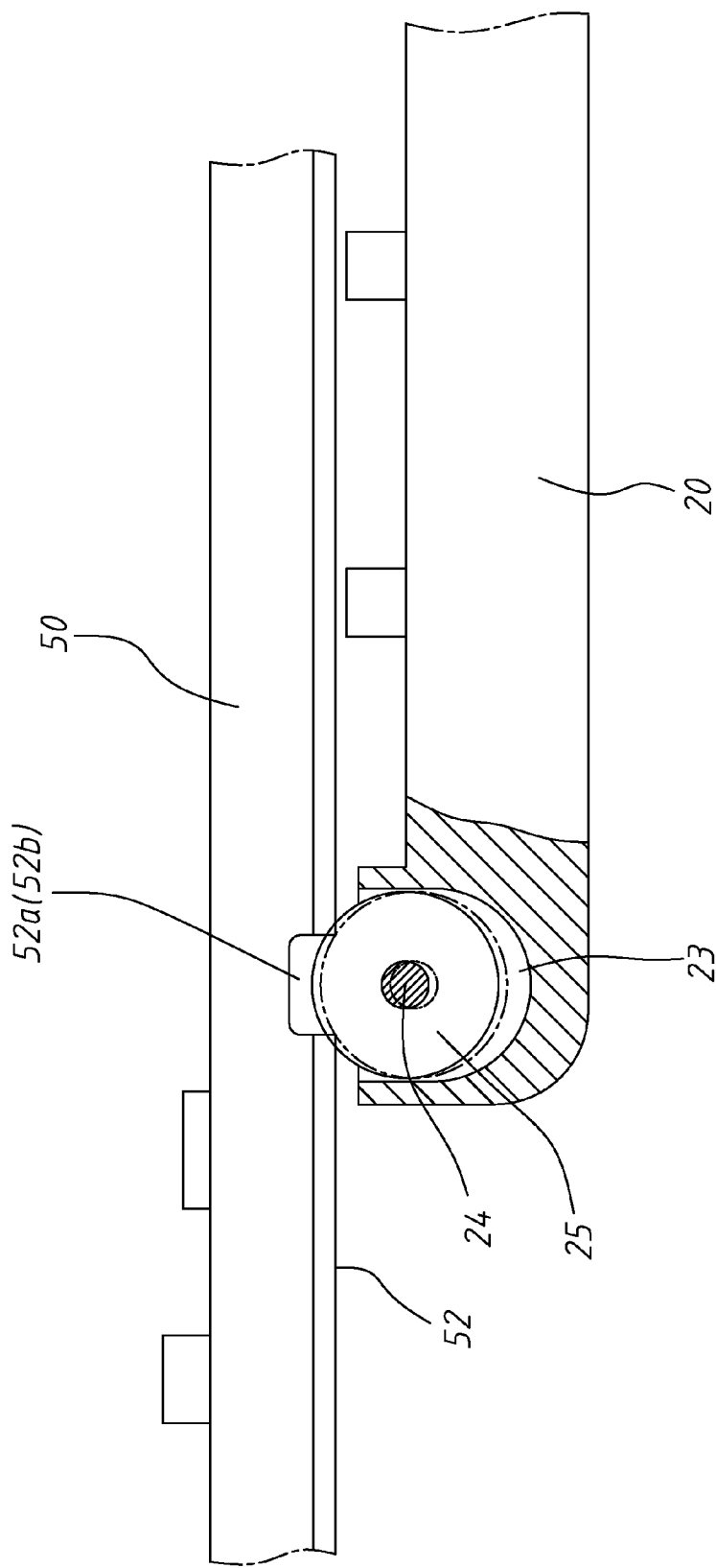
FIG. 15 is a schematic sectional view of the present invention, illustrating the relationship between the wheel of the sliding rail holder and the angled sliding rail portion of the associating sliding rail.

Referring to FIG. 6, each sliding rail holder 20 comprises a recessed portion 23 corresponding to the angled rail portion 52 of the associating sliding rail 50, a resilient wire rod 24 mounted in the recessed portion 23, and a wheel 25 pivotally mounted on the resilient wire rod 24. Referring also to FIG. 15, the wheel 25 and the resilient wire rod 24 are used as a positioning mechanism for enabling the wheel 25 to be rotated along the bottom side of the angled rail portion 52 of the associating sliding rail 50. When the wheel 25 reaches a notch 52a (or 52b shown in FIG. 6A) on the angled rail portion 52 of the associating sliding rail 50, the resilient material property of the resilient wire rod 24 immediately forces the wheel 25 into engagement with the notch 52a (or 52b), enhancing positioning stability. As the wheel 25 is rotatably kept in contact with the angled rail portion 52 of the associating sliding rail 50, it does not damage the surface of the angled rail portion 52 of the associating sliding rail 50.

Figure 4:
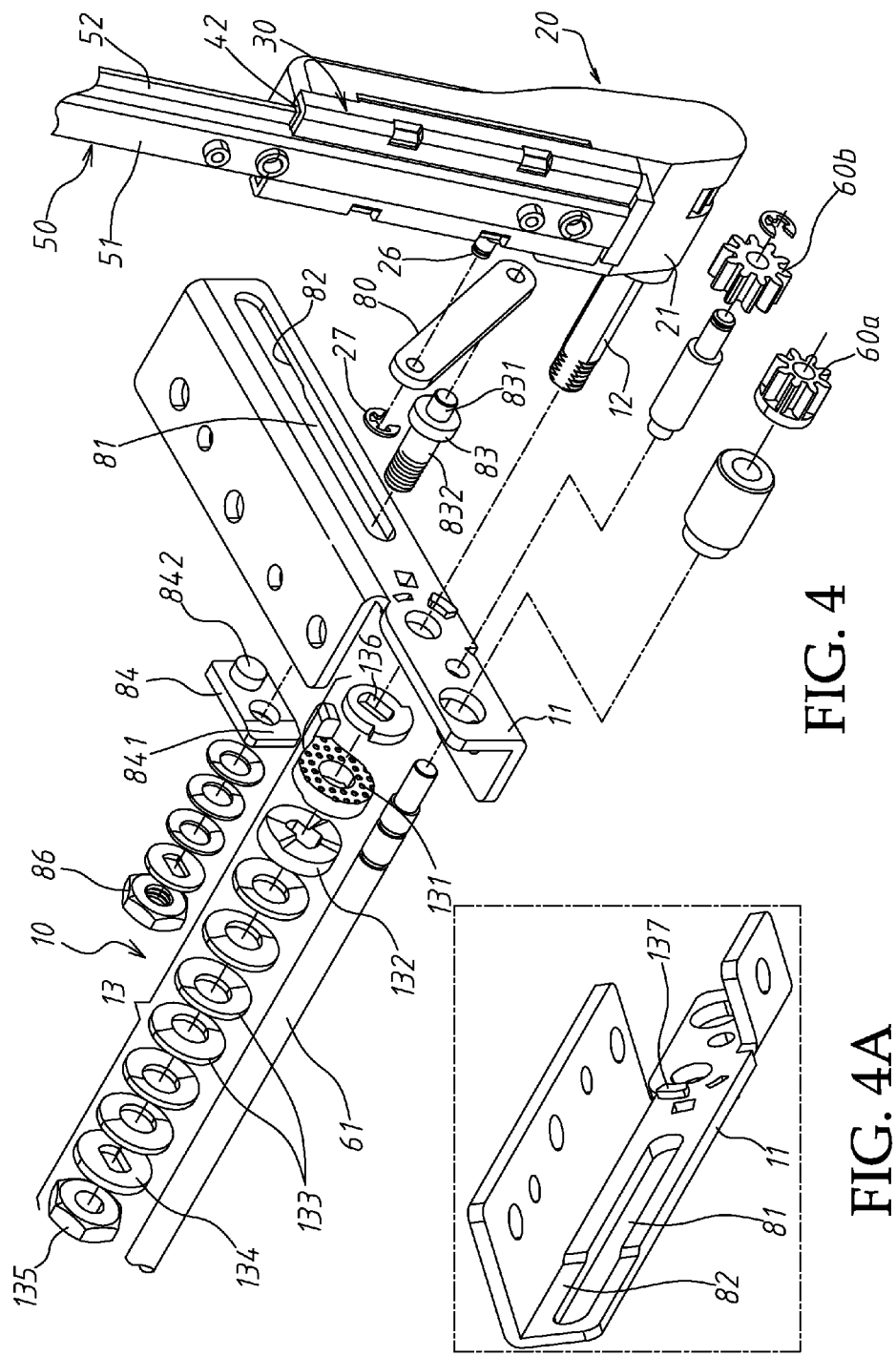
FIG. 4 is an exploded view of a part of the slide cover lifting structure in accordance with the present invention.
Figure 5:
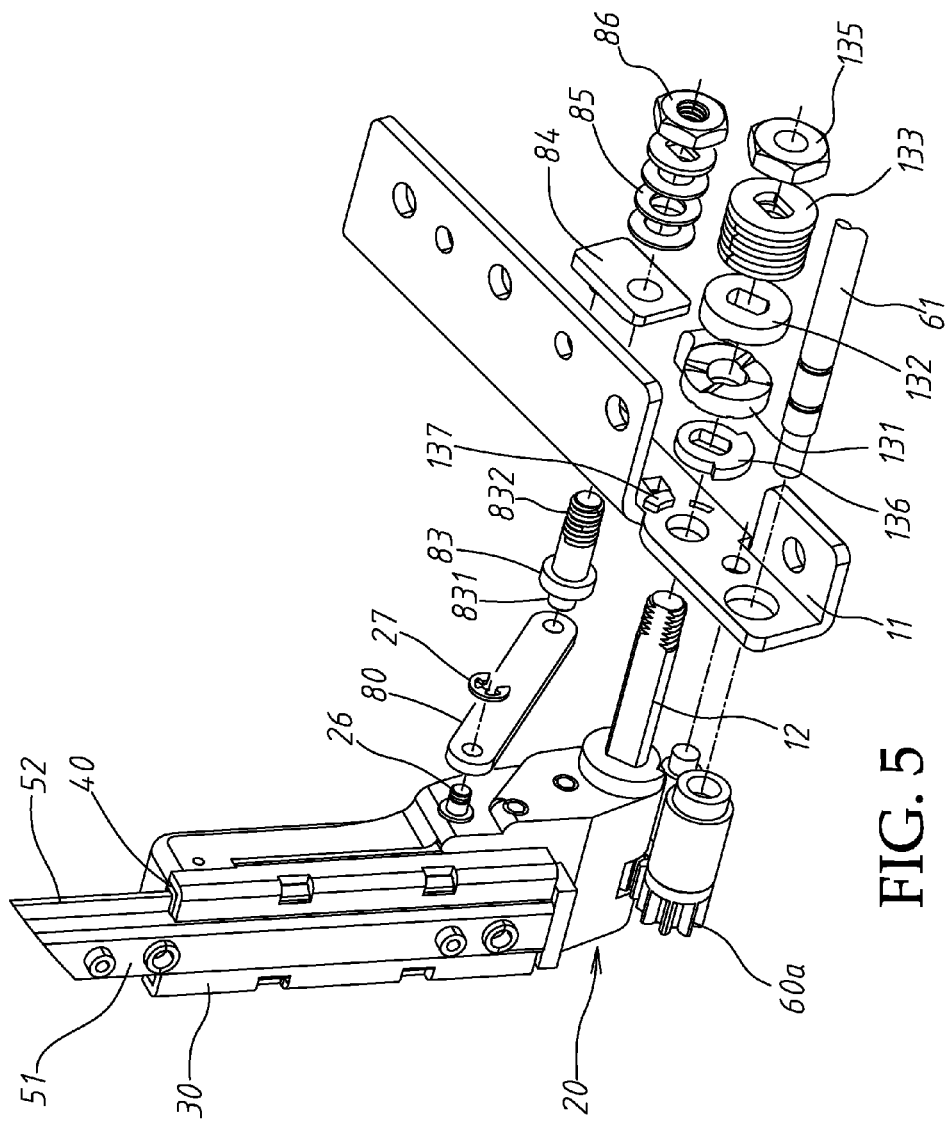
FIG. 5 is an exploded view of another part of the slide cover lifting structure in accordance with the present invention.

Further, as shown in FIGS. 4 and 5, a supplementary support bar 80 is provided between each sliding rail holder 20 and the bracket 11 of the associating hinge 10. The supplementary support bar 80 has its one end, namely, the first end rotatably connected to the sliding rail holder 20. As illustrated, the sliding rail holder 20 has a round rod 26 extended from one lateral side thereof and inserted through one end of the supplementary support bar 80 and secured thereto with a E-shaped retainer ring 27. The other end, namely, the second end of the support bar 80 is axially slidably coupled to the bracket 11. This mechanism supports the torque of the cover panel 91, preventing spring back, and therefore the size of the hinges 10 can be minimized to meet the requirements for compacting design.

Referring to FIG. 4, FIG. 4A and FIG. 5, the bracket 11 of each hinge 10 comprises a longitudinal sliding slot 81 and a recessed portion 82 around one end, namely, the rear end of the longitudinal sliding slot 81. The second end of the support bar 80 is slidably coupled to the longitudinal sliding slot 81 of the bracket 11 of the associating hinge 10 by a coupling bolt 83, a slide plate 84, a set of spring washers 85 and a locknut 86. The coupling bolt 83 is movably stopped at one side of the bracket 11, having a round rod 831 located on one end thereof and pivotally coupled with the second end of the supplementary support bar 80 and a threaded shank 832 located on an opposite end thereof and inserted in proper order through the longitudinal sliding slot 81 of the bracket 11, the slide plate 84 and the spring washers 85 and screwed up with the locknut 86. The slide plate 84 is attached to an opposite side of the bracket 11, having a beveled edge 841 facing the bracket 11 and a guide rod 842 inserted into the longitudinal sliding slot 81.

Referring to FIGS. 9~11, when the cover panel 91 is kept in the zero angle position, as shown in FIG. 9, the supplementary support bar 80 is inclined, the slide plate 84 and the coupling bolt 83 are kept in the recessed portion 82, and therefore the pressure provided by the spring washers 85 is minimized, allowing the cover panel 91 to be lifted with less effort. When the cover panel 91 is lifted to 15° angle, as shown in FIG. 10, the beveled edge 841 of the slide plate 84 is partially moved away from the recessed portion 82, the coupling bolt 83 and slide plate 84 clamping thickness is relatively increased, in consequence, the pressure provided by the spring washers 85 is relatively increased to give support the lifted cover panel 91. When the cover panel 91 is lifted to 75° angle, i.e., the maximum opening angle, as shown in FIG. 11, the beveled edge 841 of the slide plate 84 is completely moved away from the recessed portion 82, the coupling bolt 83 and slide plate 84 clamping thickness is maximized, and at this time, the pressure provided by the spring washers 85 is maximized to give sufficient support the lifted cover panel 91.

When closing the cover panel 91, the coupling bolt 83 and slide plate 84 are moved in the reversed direction, and the beveled edge 841 of the slide plate 84 is moved into the recessed portion 82 to achieve automatic locking.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A slide cover lifting structure used in an electronic device comprising a cover panel and a base member, the slide cover lifting structure comprising:

two hinges respectively fixedly mounted in two opposite sidewalls of said base member, each said hinge comprising a bracket, a non-circular pivot axle and a torque providing device;

two sliding rail holders respectively connected to the non-circular pivot axles of said two hinges and rotatable with the associating non-circular pivot axles relative to said base member, each said sliding rail holder comprising a connection block connected to the non-circular pivot axle of the associating hinge;

two bearing members respectively affixed to said sliding rail holders, each said bearing member having two grooves disposed at two opposite lateral sides thereof;

two plastic slide guides respectively formed of a pair of channel bars and respectively fixedly mounted in the grooves of said bearing members, each said channel bar defining a sliding groove;

two sliding rails bilaterally fixedly mounted on a bottom surface of said cover panel in a parallel manner, each said sliding rail comprising a flat, elongated base panel affixed to said cover panel, an angled rail extending along each of two opposite lateral side of said flat, elongated base panel and respectively slidably coupled to the sliding grooves of the channel bars of said plastic slide guides;

a transmission shaft having two distal ends thereof respectively inserted through the brackets of said hinges and affixed to said base member;

two gear sets partially pivotally mounted on said sliding rail holders and partially pivotally mounted on the brackets of said hinges, each said gear set comprising a first gear mounted on one of the two distal ends of said transmission shaft and a last gear partially and upwardly protruding over the associating sliding rail holder and the associating bearing member; and two gear racks respectively affixed to the flat, elongated base panels of said sliding rails at a bottom side thereof and respectively meshed with the last gears of said gear sets;

wherein said two sliding rails are moved with said cover panel in the sliding grooves of said plastic slide guides relative to said base member when said cover panel receives a horizontal push force, and the same time, said gear racks are forced to rotate the last gears of said gear sets, enabling the horizontal push force to be evenly transferred through said transmission shaft to the two opposite lateral sides of said base member; when said cover panel is tuned about the pivot axles of said hinges relative to said base member, the last gears of said gear sets are kept in positive engagement with said gear racks.

2. The slide cover lifting structure as claimed in claim 1, wherein the flat, elongated base panel of each said sliding rail comprises a plurality of internally threaded columns respectively affixed to said cover panel with screws.

3. The slide cover lifting structure as claimed in claim 1, wherein each said sliding rail holder comprises a non-circular coupling hole located on the connection block thereof and coupled to the non-circular pivot axle of the associating hinge.

4. The slide cover lifting structure as claimed in claim 1, further comprising two first rollers respectively pivotally mounted in said base member at two opposite lateral sides and two second rollers respectively pivotally mounted in said cover panel at two opposite lateral sides, said first rollers and said second rollers being adapted to maintain a constant gap between said cover panel and said base member.

5. The slide cover lifting structure as claimed in claim 4, further comprising two grooves respectively formed in said base member in the sliding path of said first rollers at said cover panel for enabling said constant gap to be kept between said cover panel and said base member when said cover panel is lifted from said base member.

6. The slide cover lifting structure as claimed in claim 4, further comprising two slanted grooves respectively formed in said base member in the sliding path of said first rollers at said cover panel for enabling said constant gap to be kept between said cover panel and said base member when said cover panel is lifted from said base member.

7. The slide cover lifting structure as claimed in claim 6, wherein each said slanted groove comprises half moon shaped groove portions for enabling said cover panel to be positively positioned in one of an open position and a close position.

8. The slide cover lifting structure as claimed in claim 1, wherein the angled rail portion of each said sliding rail comprises two notches; each said sliding rail holder comprises a recessed portion corresponding to the angled rail portion of the associating sliding rail, a resilient wire rod mounted in the recessed portion, and a wheel pivotally mounted on said resilient wire rod and forcible by said resilient wire rod into engagement with one of the two notches of the angled rail portion of the associating sliding rail.

9. The slide cover lifting structure as claimed in claim 1, further comprising two supplementary support bars respectively coupled between said sliding rail holders and the brackets of said hinges, each said supplementary support bar having a first end thereof pivotally connected to the associating sliding rail holder and a second end thereof slidably coupled to the bracket of the associating hinge.

10. The slide cover lifting structure as claimed in claim 9, wherein the bracket of each said hinge comprises a longitudinal sliding slot and a recessed portion around a rear end of said longitudinal sliding slot; the second end of each said supplementary support bar is slidably coupled to the longitudinal sliding slot of the bracket of the associating hinge by a coupling bolt, a slide plate, a set of spring washers and a locknut, said coupling bolt being movably stopped at one side of the bracket of the associating hinge and comprising a round rod located on one end thereof and pivotally coupled with the second end of the associating supplementary support bar and a threaded shank located on an opposite end thereof and inserted in proper order through the longitudinal sliding slot of the bracket of the associating hinge, said slide plate and said spring washers and screwed up with said locknut, said slide plate being attached to an opposite side of the bracket of the associating hinge and comprising a beveled edge facing the bracket of the associating hinge and a guide rod inserted into the longitudinal sliding slot of the bracket of the associating hinge.

\* \* \* \* \*